United States Patent
Pettinotti et al.

(10) Patent No.: US 9,850,820 B2
(45) Date of Patent: Dec. 26, 2017

(54) POWER TRANSMISSION SYSTEM FOR A TURBINE ENGINE

(71) Applicants: SNECMA, Paris (FR); HISPANO-SUIZA, Colombes (FR)

(72) Inventors: Serge Dominique Pettinotti, Courbevoie (FR); Vincent Abousleiman, Colombes (FR); Sebastien Bourget, Touman en Brie (FR); Mickael Moreiras, Lieusaint (FR); Diane Gueudry, Suresnes (FR); Bernard Cartier, La Chapelle Gauthier (FR); Florian Poinsot-Berthelot, Samois sur Seine (FR)

(73) Assignees: SNECMA, Paris (FR); HISPANO SUIZA, Colombes (FR)

( * ) Notice: Subject to any disclaimer, the term of this patent is extended or adjusted under 35 U.S.C. 154(b) by 674 days.

(21) Appl. No.: 14/506,226

(22) Filed: Oct. 3, 2014

(65) Prior Publication Data
US 2015/0033890 A1 Feb. 5, 2015

Related U.S. Application Data

(63) Continuation of application No. PCT/FR2013/050715, filed on Mar. 29, 2013.

(30) Foreign Application Priority Data

Apr. 6, 2012 (FR) .................................. 12 53241

(51) Int. Cl.
*F02C 7/32* (2006.01)
*F02C 7/36* (2006.01)
(Continued)

(52) U.S. Cl.
CPC .............. *F02C 7/36* (2013.01); *F01D 25/164* (2013.01); *F02C 7/32* (2013.01); *F16C 3/023* (2013.01);
(Continued)

(58) Field of Classification Search
CPC ...... F02C 7/36; F02C 7/32; F16H 1/14; F16C 3/023; F01D 25/164; F05B 2260/96
See application file for complete search history.

(56) References Cited

U.S. PATENT DOCUMENTS 3,269,118 A * 8/1966 Benedict ................... F02C 7/32
    244/58
3,688,560 A * 9/1972 Broman .................... F16H 1/14
    60/802
(Continued)

FOREIGN PATENT DOCUMENTS

DE  25 43 258 A1  3/1977
EP  1 898 072 A1  3/2008
(Continued)

OTHER PUBLICATIONS

International Search Report issued dated Jun. 11, 2013 for PCT/FR2013/050715 filed on Mar. 29, 2013.
(Continued)

*Primary Examiner* — Gregory Anderson
*Assistant Examiner* — Eldon Brockman
(74) *Attorney, Agent, or Firm* — Oblon, McClelland, Maier & Neustadt, L.L.P.

(57) ABSTRACT

A power transmission system for a turbine engine is provided. The power transmission system includes a transmission shaft that is connected to a drive shaft by bevel gears, and that drives equipment or accessories. The transmission
(Continued)

shaft is designed to operate under supercritical conditions and includes a damper system for damping vibration at its resonant speed.

10 Claims, 3 Drawing Sheets

(51) Int. Cl.
    *F01D 25/16*     (2006.01)
    *F16C 3/02*     (2006.01)
    *F16H 1/14*     (2006.01)

(52) U.S. Cl.
    CPC ............ *F16H 1/14* (2013.01); *F05B 2260/96* (2013.01); *Y02T 50/671* (2013.01); *Y10T 74/19688* (2015.01)

(56) References Cited

U.S. PATENT DOCUMENTS

| | | | | |
|---|---|---|---|---|
| 4,118,927 | A * | 10/1978 | Kronogard | F02C 7/36 60/39.163 |
| 4,324,440 | A * | 4/1982 | Steigenberger | F16C 17/20 384/102 |
| 4,566,269 | A * | 1/1986 | Gingras | F02C 7/32 60/226.1 |
| 5,110,257 | A * | 5/1992 | Hibner | F01D 25/164 415/119 |
| 6,058,791 | A * | 5/2000 | Brunet | F02C 7/32 192/69.9 |
| 7,055,330 | B2 * | 6/2006 | Miller | F02C 7/32 60/792 |
| 8,006,501 | B2 * | 8/2011 | Dusserre-Telmon | F02C 7/32 60/802 |
| 2008/0053257 | A1 * | 3/2008 | Dusserre-Telmon | F02C 7/32 74/11 |

FOREIGN PATENT DOCUMENTS

| | | |
|---|---|---|
| FR | 2 333 955 A1 | 7/1977 |
| GB | 2 055 992 A | 3/1981 |
| JP | 2003-269191 A | 9/2003 |
| JP | 2003-269192 A | 9/2003 |
| JP | 2003-343284 A | 12/2003 |

OTHER PUBLICATIONS

Khronin, "7.8.3 Design and stress analysis of "squirrel wheel" type supports" Design and Conception of Aircraft Gas Turbine Engines, 1989, pp. 373-378 (with English language translation).

Skubachevsky, "2. "Rigid" and "Flexible" Shafts" Aircraft Gas Turbine Engines. Design and Stress Analysis of Parts 1969, pp. 327-329 (with English language translation).

* cited by examiner

POWER TRANSMISSION SYSTEM FOR A TURBINE ENGINE

BACKGROUND OF THE INVENTION

Field of the Invention

The invention relates to a power transmission system and to a turbine engine fitted to such a system.

Description of the Related Art

Conventionally, a turbine engine comprises an upstream fan, a low pressure compressor, a high pressure compressor, a combustion chamber, a high pressure turbine, and a low pressure turbine. A structural intermediate casing is arranged between the low pressure and high pressure compressors and includes arms extending across the primary air stream flowing through the compressors, the combustion chamber, and the turbines, and across the secondary air stream bypassing the turbojet.

A power transmission shaft is connected to the high pressure compressor shaft via connection means such as bevel gears, and it extends radially inside one of the radial arms of the intermediate casing in order to drive various accessories and pieces of equipment.

At present, the transmission shaft is dimensioned so that its first resonant speed is faster than its maximum speed of rotation in operation. In such a configuration, the transmission shaft is said to operate under "subcritical" conditions, and it cannot enter into resonance in operation, thereby limiting vibration of the transmission shaft.

Nevertheless, in order to enable the transmission shaft to operate under subcritical conditions, it is necessary for said shaft to be dimensioned with at least some minimum diameter in order to ensure it is sufficiently rigid, thereby increasing its weight. This minimum diameter for the transmission shaft requires the radial arm that houses it to have at least some corresponding minimum section.

Unfortunately, the radial arm housing the transmission shaft also needs to enable the flow of the primary and secondary air streams across which it extends to be disturbed little, and that is difficult to achieve with a radial arm of large section, thereby reducing aerodynamic performance and reducing the efficiency of the turbine engine.

BRIEF SUMMARY OF THE INVENTION

A particular object of the present invention is to provide a solution to those problems of the prior art that is simple, effective, and inexpensive.

To this end, the invention provides a power transmission system, in particular for a turbine engine such as an airplane turboprop or turbojet, the system comprising a transmission shaft connected to a drive shaft by connection means, e.g. such as bevel gears, and that drive equipment or accessories, the system being characterized in that the transmission shaft is designed to operate under supercritical conditions and includes damper means for damping vibration at its resonant speed.

Numerous interdependent parameters of the shaft such as its weight, its material, its section, its length, its shape, etc. all have an influence on its resonant speed. In particular, reducing the section of the shaft serves to reduce its resonant speed.

In the invention, the shaft of the power transmission system is dimensioned in such a manner that at least its first resonant speed lies within the range of speeds of rotation of the transmission shaft in operation, thereby enabling its section and thus its weight and its size to be reduced, but without that leading to problems on passing through its resonant speed because of the vibration absorber means provided by the invention. In a turbine engine, it then becomes possible to reduce the section of the intermediate casing radial arm that houses the transmission shaft, thus enabling the aerodynamic performance of the arm to be improved and increasing the efficiency of the turbine engine.

According to another characteristic of the invention, the damper means are mounted removably in a housing carried by a stationary structural element, it thus being possible for the removable housing to be removed in order to remove the transmission shaft and the damper means, thereby facilitating maintenance operations.

Advantageously, the housing is incorporated in removable manner in a housing of the connection means for connecting the transmission shaft to the equipment it is to drive.

In an embodiment of the invention, the vibration damper means comprise an oil film compression damper.

Preferably, the oil film compression damper is formed around a bearing for guiding the transmission shaft.

In a particular embodiment of the invention, the oil film of the damper is formed in an annular space between an inner annular surface of the removable housing and an annular part surrounding an outer ring of the guide bearing.

According to another characteristic of the invention, the oil film is confined laterally by at least two annular sealing gaskets engaged in annular housings in the annular part and/or in the removable housing.

Preferably, the annular gaskets are made of carbon. Unlike metal, carbon has a modulus of elasticity that is about ten times smaller and its coefficient of friction is also smaller.

Thus, reducing the stiffness and the coefficient of friction make it possible to increase significantly the ability of the transmission shaft to move radially, thereby providing better dissipation of the vibrational energy in the oil film.

According to yet another characteristic of the invention, the guide bearing is engaged on a cylindrical bearing surface of the shaft and is held axially at one end by a nut screwed onto a threaded portion of the cylindrical bearing surface or of the annular part, and at its other end by a radial rim of the transmission shaft.

The invention also provides a turbine engine including at least one transmission system as described above and in which the transmission shaft extends in a radial arm of an intermediate casing.

Advantageously, the damper means are mounted removably around the radially outer end of the transmission shaft, thus avoiding any increase in the section of the radial arm used for passing the transmission shaft, as compared with mounting damper means in the radial arm.

Preferably, the damper means are mounted in a removable housing around the radially outer end of the transmission shaft and inside an opening in a stationary structure carried by the intermediate casing.

Mounting the removable housing in this way at the radially outer end of the transmission shaft enables the removable housing to be removed simply and quickly together with the transmission shaft in order to perform maintenance operations. Furthermore, in operation, the flow of the secondary air stream flowing around the radial arms can lead to deformation of the intermediate casing. Mounting the removable housing in the radially outer position makes it possible to limit the impact of any deformation of the intermediate casing on the damper means, thus guaranteeing proper operation of the damper means.

The invention also provides a method of transmitting power to equipment or accessories of a turbine engine such as an airplane turboprop or turbojet by means of a transmission shaft connected to a drive shaft by connection means, the method being characterized in that it consists in causing the transmission shaft to rotate at a supercritical speed and in damping vibration while it is operating at its resonant speed.

BRIEF DESCRIPTION OF THE SEVERAL VIEWS OF THE DRAWINGS

Other advantages and characteristics of the invention appear on reading the following description made by way of non-limiting example and with reference to the accompanying drawings, in which.

DETAILED DESCRIPTION OF THE INVENTION

Figure 1:
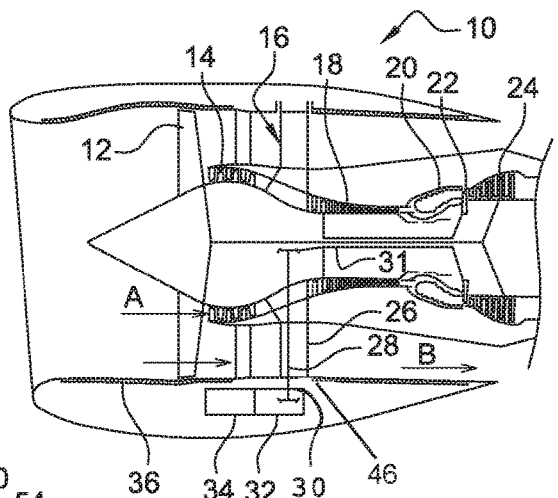
FIG. 1 is a diagrammatic axial section view of a turbine engine.

Reference is made initially to FIG. 1, which shows a turbine engine 10 comprising from upstream to downstream: a fan 12; a low pressure compressor 14; an intermediate casing 16; a high pressure compressor 18; a combustion chamber 20; a high pressure turbine 22; and a low pressure turbine 24. Air entering the engine is split into a primary air stream (arrows A) that flows inside the low and high pressure compressor 14, 18 to the combustion chamber 20 and then through the high and low pressure turbines 22, 24, and into a secondary air stream (arrows B) that bypasses the compressors 14, 18, the combustion chamber 20, and the turbine 22, 24.

The intermediate casing 16 has structural arms 26 extending radially outwards through the primary and secondary air streams (arrows A and B). One of the arms 26 of the intermediate casing 16 contains a radial power transmission shaft 28 having its inner end rotatably connected to the shaft 31 of the high pressure compressors 18 via internal connection means. The radially outer end of the transmission shaft 28 is connected via outer connection means 30 to pieces of equipment; such as for example: a lubrication unit; a hydraulic pump; a starter; a generator; etc.

The outer connection means 30 are arranged in a housing 32 adjacent to the housing 34 that houses the equipment that is to be driven.

The housing 32 of the connection means 30 and the accessory housing 34 are carried by a fan casing 36 and by an outer annular shroud 38 of the intermediate casing 16.

In operation, the transmission shaft 28 transmits power from the drive shaft 31 of the high pressure compressor to the equipment that requires such power and that is housed in the housing 34.

In order to limit vibration of the transmission shaft 28, it needs to be of diameter that is sufficient to provide it with enough stiffness to avoid it having a resonant speed lying in its range of speeds of rotation in operation.

As a result, the radial arm 26 for passing the transmission shaft 28 must also have a section that is large enough for housing the transmission shaft 28, thereby reducing aerodynamic performance around the radial arm 26 and reducing the efficiency of the engine 10.

The invention provides a solution to that problem by providing a power transmission system in which the transmission shaft 40 is designed to operate under supercritical conditions, i.e. with at least one resonant speed lying within the range of speeds of rotation in operation of the transmission shaft 40, by adding damper means for limiting the vibration of the transmission shaft 40 when it passes through its resonant speed.

Figure 2:
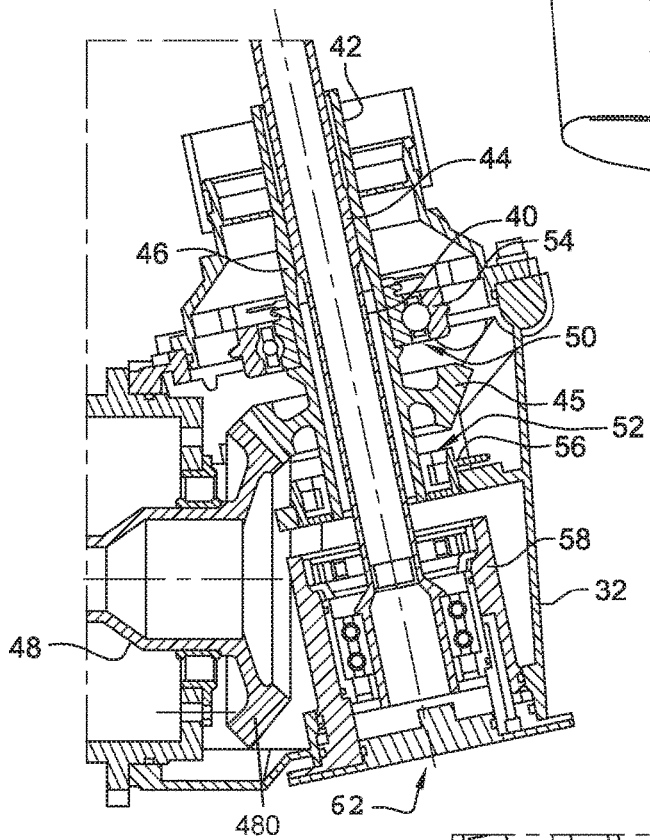
FIG. 2 is a diagrammatic axial section view of the radially outer end portion of the transmission shaft and of the means connecting with the equipment of the engine.

FIG. 2 shows the radially outer end of the transmission shaft 40 of a transmission system of the invention.

The radially outer portion of the transmission shaft 40 is mounted in a tubular shaft 42 of the connection means. The transmission shaft 40 is coupled in rotation with the tubular shaft 42 via fluting 44 formed in the outer surface of the transmission shaft 40 and complementary fluting 46 formed in the inner surface of the tubular shaft 42.

On its outer periphery, the tubular shaft 42 includes a bevel gear 45 meshing with a bevel gear 480 of the shaft 48 for delivering power to the equipment. The bevel gear 45 of the tubular shaft 42 is interposed between two rolling bearings 50 and 52 mounted on either side of the bevel gear 45. Each bearing 50, 52 comprises an outer ring 54, 56 secured to the housing 32 that houses the connection means 30.

The transmission system 30 of the invention includes a removable housing 58 inserted in an opening of the housing 32 of the connection means 30 and engaged around the radially outer end of the transmission shaft 40. The removable housing 58 has an outer annular rim 60 pressing against the outer surround of the opening in the housing 32 of the connection means. The removable housing 58 is substantially in the form of a cylinder that is open at both ends. The opening in the removable housing 58 that leads to the outside of the housing 32 of the connection means and is shut by a cover 62 including a central portion 64 engaged in leaktight manner with the inside of the opening in the removable housing 58 and connected around its outer periphery to an annular rim 66 applied against the annular rim 60 of the removable housing.

The radially outer end of the transmission shaft 40 includes a cylindrical bearing surface 68 having mounted thereon first and second axially superposed bearings 70 and 72, such as ball bearings. The inner rings 74, 76 of the first and second bearings 70, 72 are prevented from moving axially by a nut 78 screwed onto a thread at the free end of the cylindrical bearing surface 68, and by a radially projecting annular rim 80 formed at the other end of the cylindrical bearing surface 68.

An annular part 82 is mounted around the outer rings 84, 86 of the bearings 70, 72 so as to leave an annular space between the outer surface of the annular part 82 and the inner surface of the removable housing 58. This annular space is closed axially by annular sealing gaskets 88, preferably made of carbon, mounted in annular grooves in the outer surface of the annular part 82.

In a practical embodiment, the gaskets are rectangular in section and the section of each gasket, and more particularly its width (in a direction parallel to the transmission shaft) and its height (in a direction perpendicular to the transmission shaft) need to be determined in such a manner that the stress to which they are subjected in the enlarging direction while they are being put into position in the grooves does not lead to any breakage of the gasket.

The annular space is filled with oil to form a damper based on compressing (squeezing) a film of oil that absorbs the vibration of the transmission shaft 40 when it passes through its resonant speed. The oil is conveyed via at least one channel 41 formed in the thickness of the removable housing and opening out into the annular space. This channel is connected to oil feed means.

The annular part 82 is prevented from moving axially in the removable housing 58 by its end situated beside the free end of the transmission shaft 40 resting against a shoulder 89 of the inner surface of the removable housing 58. The annular part 82 includes an annular rim 90 at the same end against which the outer ring 84 of the first bearing 70 is prevented from moving axially.

At its other end, the annular part is prevented from moving axially by an annular spacer 92 and by a nut 94 for locking the spacer 92, the nut 94 having a thread on its outer surface that engages in a complementary thread on the inner surface of the removable housing 58.

Figure 3:
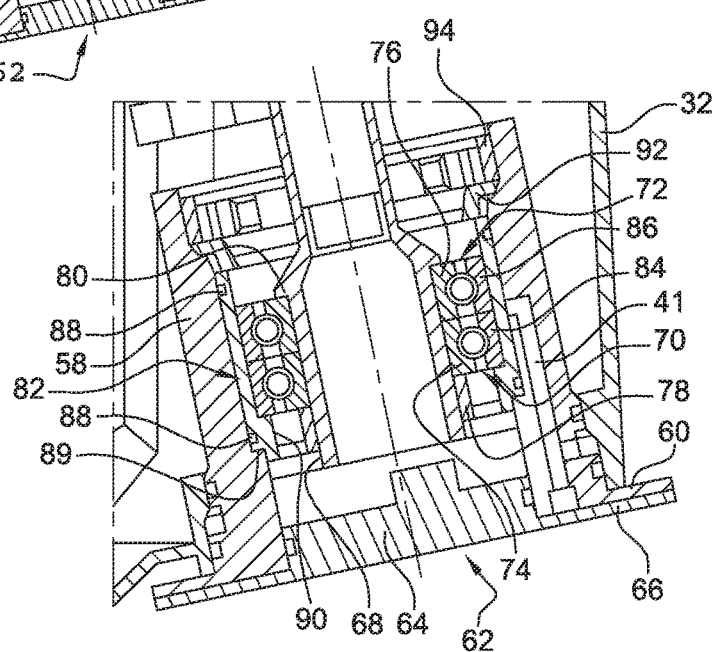
FIG. 3 is a diagrammatic axial section view on a larger scale of the zone outlined in dashed lines in FIG. 2.

The removable housing 58 and the oil film compression damper means around the radially outer end of the transmission shaft 40 are mounted as follows: the annular part 82 is inserted by being moved in translation inside the removable housing 58 so as to clamp it in abutment against the shoulder 89, and then the operator inserts in succession the first and second bearings 70, 72, the spacer 92 is then inserted followed by the nut 94, which is screwed in the removable housing 58. The removable housing 58 fitted out in this way is mounted on the transmission shaft 40 so that the inner rings 74, 76 of the first and second bearings 70, 72 slide on the cylindrical bearing surface 68 until the inner ring 76 of the second bearing 72 comes into abutment against the radial rim 80 of the transmission shaft 40. The nut 78 is then screwed onto the free end of the cylindrical bearing surface 68, thereby preventing the first and second bearings 70 and 72 from moving on the transmission shaft 40. The assembly formed by the transmission shaft 40 and the removable housing 58 is then inserted in the opening in the housing 32 of the connection means until the annular rim 60 of the removable housing 58 comes to bear against the outer surround of the opening in the housing 32 of the connection means. Finally, in a last step, the cover 62 is mounted on the removable housing 58 so as to shut its opening, as shown in FIGS. 2 and 3.

Figure 4:
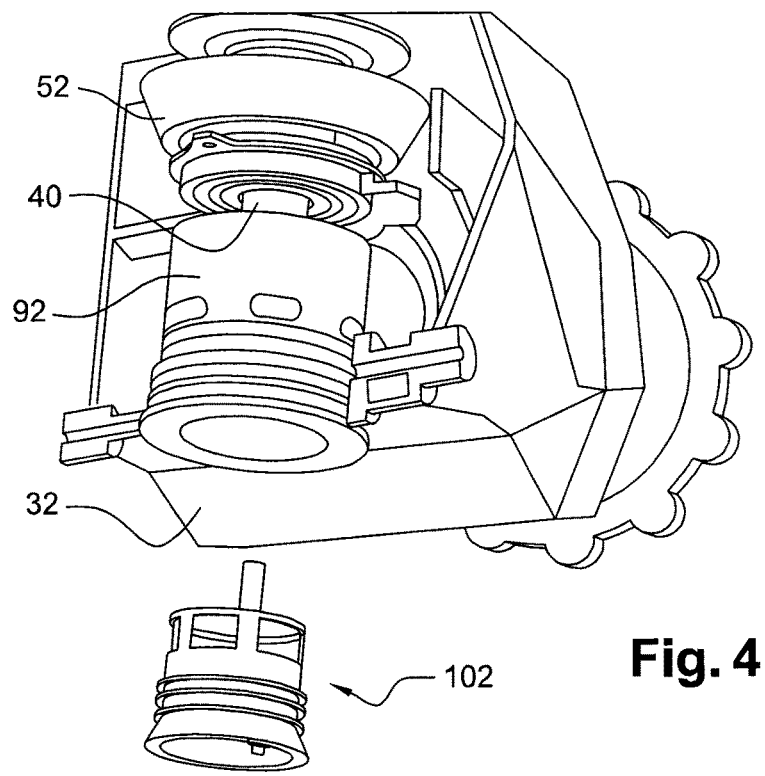
FIG. 4 is a diagrammatic perspective and section view of the damper means mounted in a removable housing at the radially outer end of the transmission shaft in a variant embodiment of the invention.
Figure 5:
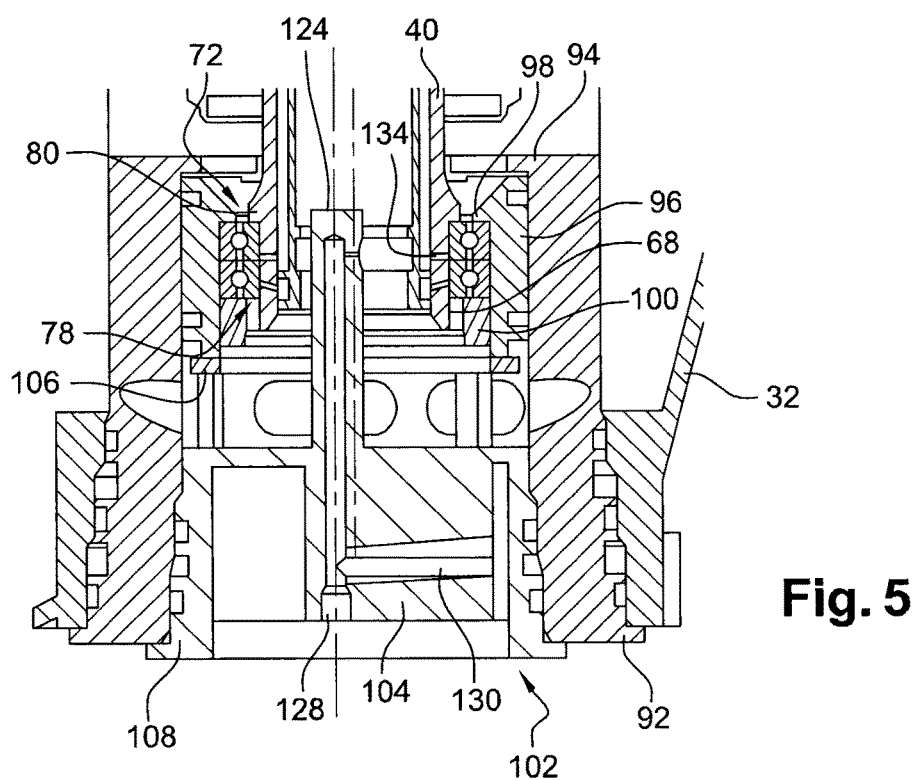
FIG. 5 is a diagrammatic section view of the FIG. 4 housing.

FIGS. 4 and 5 show a variant embodiment of the invention. In this variant, the housing 92 is likewise substantially cylindrical in shape having a radial rim 94 at its end situated inside the housing of the connection means 32. The annular part 96 has a radial annular rim 98 situated facing the radial annular rim 80 of the power transmission shaft 40. A nut 100 is engaged with the inner face of the annular part 96, and at its end situated remote from its annular rim 98, the nut 100 comes to bear against the outer ring 84 of the first bearing 70. The cover 102 is shown in its separated position in FIG. 4 and likewise has a middle portion 104 engaged in leaktight manner inside the removable housing 92, as shown in FIG. 5. The end 106 of the cover 102 remote from its rim 108 comes to bear against the annular part 96 in order to hold it axially in position in the removable housing 92.

In this variant embodiment of the invention, mounting is performed as follows: the annular part 96 is inserted inside the removable housing 92 so as to come into abutment against the radial annular rim 94 of the removable housing 92. The first and second bearings 72 and 78 are mounted between the cylindrical bearing surface 68 of the transmission shaft 70 and the annular part 96, the nut 100 then being engaged with the annular part 96. The assembly formed by the transmission shaft 40 and the removable housing 92 is then inserted in the opening of the housing 32 of the connection means. The cover 102 is finally mounted on the removable housing 92.

Figure 6:
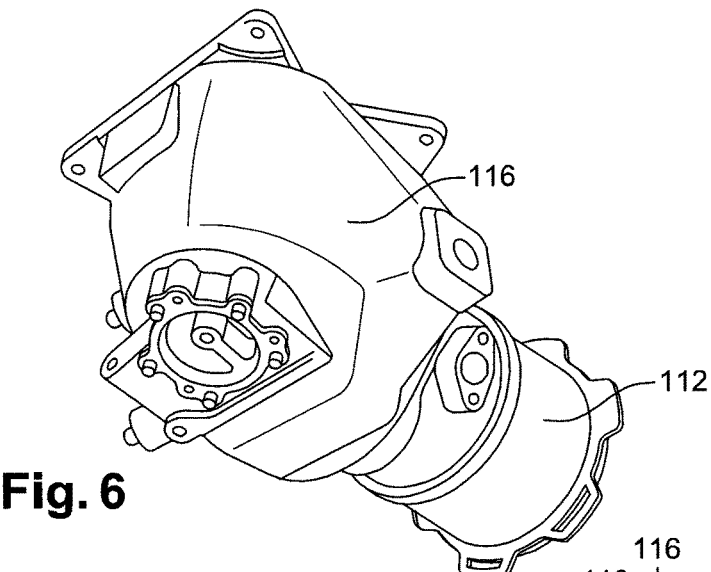
FIGS. 6 and 7 are diagrammatic perspective views of the connection means housing the damper means in another variant of the invention.
Figure 7:
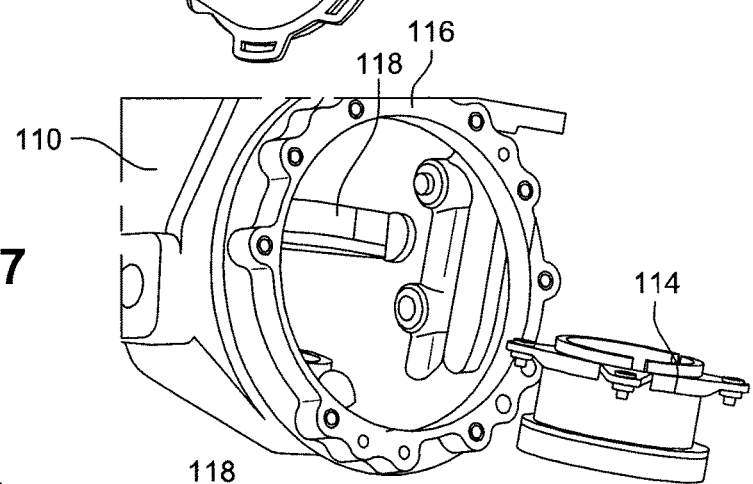
Figure 8:
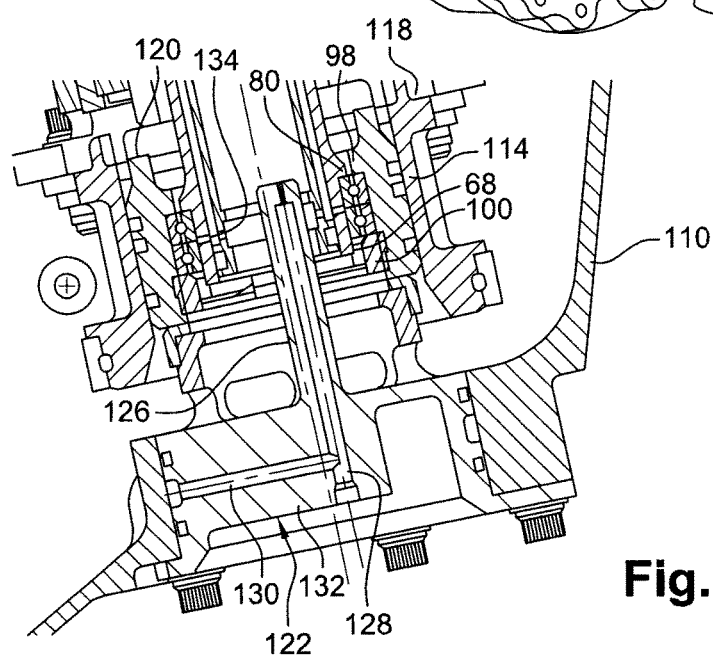
FIG. 8 is a diagrammatic section view of the FIG. 6 housing.

FIGS. 6-8 show another variant embodiment of the invention. FIG. 6 shows the housing 110 of the connection means fastened to the housing 112 of the accessory means. In this variant, the housing 114 housing the damper means is mounted through the opening 116 for passing the power take-off shaft for the equipment, and it is screwed to a stationary portion 118 situated inside the housing 110 of the connection means.

Unlike the two above-described embodiments, the housing 114 is received completely inside the housing 110 of the connection means and it is not mounted via the opening in the housing 110 that serves to insert the power transmission shaft. In this configuration, removing the housing 114 housing the damper means thus requires the accessory housing 112 to be removed.

In this variant of the invention, mounting is performed as follows: the housing 114 is mounted via the orifice 116 for passing the power take-off shaft. The annular part 120 and the rolling bearings 72, 78 are then mounted around the cylindrical bearing surface 68 of the shaft, and then the nut 100 is engaged with the annular part 120. This assembly mounted on the power transmission shaft 40 is inserted inside the housing 114, and then the cover 122 is mounted so that its inner end comes to bear against the annular part and so as to shut the opening of the housing of the connection means.

As shown in FIGS. 5 and 8, the cover 102, 122 may include an axial finger 124, 126 extending inside the power transmission shaft 40 and including at least one internal channel 128 co-operating with one or more channels 130 of the middle portion 104, 132 of the cover 102, 122. These channels 130 are connected to oil feed means so that oil can flow to the free end of the finger 124, 126 and be projected into the inside of the shaft. This oil then flows to the rolling bearings 72, 78 via orifices 134 formed in the shaft.

Compared with the prior art, the invention makes it possible to reduce the radial size of the transmission shaft 40 and the radial size of the radial arm of the intermediate casing in which it is housed. It is thus easier to shape the radial arm so that it allows a good flow of air in operation. Reducing the radial size of the shaft 40 enables it to operate in supercritical mode without there leading to difficulties on passing through its resonant speed because of the presence of the vibration damper means.

The use of a removable housing 58 arranged at the radially outer end of the transmission shaft 40 facilitates maintenance operations, in particular when the housing can be removed without removing the accessory housing or the housing of the connection means. In all of the configurations shown in the figures, the damper means are mounted at the radially outer end of the shaft, thereby making them easier to remove.

Finally, in operation, the casings, and in particular the intermediate casing, deform under the effect of aerodynamic forces, which can lead to misalignment between the inner connection means and the outer connection means. In the invention, mounting the damper means in a housing 58, 92, 114 that is secured in operation to the housing of the outer connection means and to the intermediate casing serves to make the damper means insensitive to such deformation, thereby optimizing operation of the damper means.

In other embodiments of the invention, the vibration damper means may be mounted at the radially inner end of the transmission shaft 40, however that would not be so easy for mounting and for removal as an arrangement in which it is mounted at the radially outer end of the transmission shaft 40, as described with reference to FIGS. 2 and 3. In other variant embodiments of the invention, the rolling bearings may be of the ball bearing type, e.g. of the type having conical contact surfaces making it possible simultaneously to take up loads that are both radial and axial.

The invention claimed is:

1. A power transmission system for a turbine engine, the power transmission system comprising:
   a transmission shaft connected to a drive shaft;
   a connection system that connects the transmission shaft to equipment or accessories driven by the transmission shaft; and
   a removable housing engaged around a radially outer end of the transmission shaft,
   wherein the transmission shaft is designed to operate under supercritical conditions and includes a damper system which damps vibration at a resonant speed of the transmission shaft,
   wherein a guide bearing is mounted on a cylindrical bearing surface of the radially outer end of the transmission shaft, and
   wherein the damper system includes an oil film compression damper formed in an annular space between an inner annular surface of the removable housing and an annular part surrounding an outer ring of the guide bearing.

2. The power transmission system according to claim 1, wherein the removable housing is carried by a stationary structural element.

3. The power transmission according to claim 2, wherein the removable housing is mounted in a housing of the connection system for connecting the transmission shaft to the equipment or the accessories driven by the transmission shaft.

4. The power transmission system according to claim 1, wherein the oil film is confined laterally by at least two annular sealing gaskets engaged in at least one of annular housings in the annular part and the removable housing.

5. The power transmission system according to claim 4, wherein the annular gaskets are made of carbon.

6. A turbine engine, comprising at least one power transmission system according to claim 1,
   wherein the transmission shaft extends in a radial arm of an intermediate casing.

7. The turbine engine according to claim 6, wherein the removable housing is mounted inside an opening in a stationary structure carried by the intermediate casing.

8. The power transmission system according to claim 1, wherein the guide bearing is axially held at a first end by a nut which is screwed onto a threaded portion of the cylindrical bearing surface or of the annular part, and is axially held at a second end by a radial rim of the transmission shaft.

9. A method of transmitting power to equipment or accessories of a turbine engine by a transmission shaft connected to a drive shaft via a connection system that connects the transmission shaft to the equipment or accessories of the turbine engine, the method comprising:
   causing the transmission shaft to rotate at a supercritical speed; and
   damping vibration via a damping system while the transmission shaft is operating at a resonant speed of the transmission shaft,
   wherein a removable housing engaged around a radially outer end of the transmission shaft,
   wherein a guide bearing is mounted on a cylindrical bearing surface of the radially outer end of the transmission shaft, and
   wherein the damper system includes an oil film compression damper formed in an annular space between an inner annular surface of the removable housing and an annular part surrounding an outer ring of the guide bearing.

10. The method according to claim 9, wherein the guide bearing is axially held at a first end by a nut which is screwed onto a threaded portion of the cylindrical bearing surface or of the annular part, and is axially held at a second end by a radial rim of the transmission shaft.

* * * * *